United States Patent [19]

Stiller et al.

[11] 4,365,602
[45] Dec. 28, 1982

[54] TIMING SIGNAL GENERATOR FOR IGNITION AND FUEL INJECTION SYSTEMS IN A 4-STROKE INTERNAL COMBUSTION ENGINE

[75] Inventors: Armin Stiller, Brunswick; Manfred Knoke, Wolfsburg, both of Fed. Rep. of Germany

[73] Assignee: Volkswagenwerk Aktiengesellschaft, Wolfsburg, Fed. Rep. of Germany

[21] Appl. No.: 203,112

[22] Filed: Nov. 3, 1980

[30] Foreign Application Priority Data

Dec. 21, 1979 [DE] Fed. Rep. of Germany ....... 2951622

[51] Int. Cl.³ .......................... F02P 9/00; F02D 5/02
[52] U.S. Cl. .................................. 123/414; 123/476; 123/490; 123/612; 123/643
[58] Field of Search ............... 123/414, 490, 494, 612, 123/617, 643, 146.5 A, 476, 477, 613

[56] References Cited

U.S. PATENT DOCUMENTS

| 3,621,826 | 11/1971 | Chrestensen | 123/613 |
| 3,757,755 | 9/1973 | Carner | 123/414 |
| 4,009,699 | 3/1977 | Hetzler et al. | 123/146.5 A |
| 4,112,895 | 9/1978 | Habert | 123/414 |
| 4,181,884 | 1/1980 | Shirasaki et al. | 123/414 |

Primary Examiner—Charles J. Myhre
Assistant Examiner—Andrew M. Dolinar
Attorney, Agent, or Firm—Brumbaugh, Graves, Donohue & Raymond

[57] ABSTRACT

An apparatus for generating signals to control the firing of spark plugs or the operation of a fuel injection distributor for an internal combustion engine having multiple cylinders utilizes sensors that scan markings on the crankshaft and camshaft and an evaluating circuit to develop such control signals.

3 Claims, 6 Drawing Figures

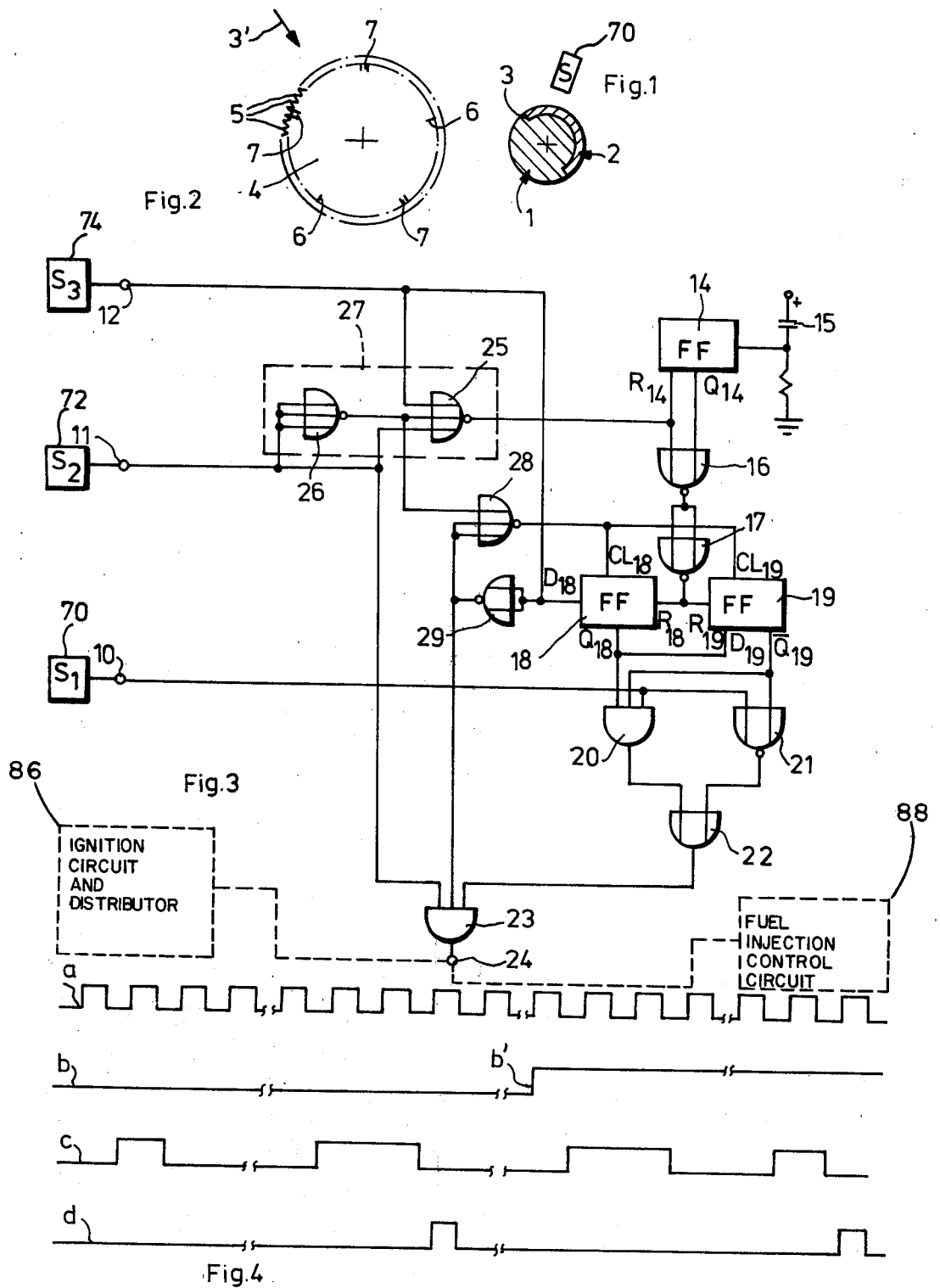

TIMING SIGNAL GENERATOR FOR IGNITION AND FUEL INJECTION SYSTEMS IN A 4-STROKE INTERNAL COMBUSTION ENGINE

BACKGROUND OF THE INVENTION

This invention relates to an apparatus for generating control signals for the ignition or fuel injection system in a multiple cylinder, 4-cycle internal combustion engine. More particularly, this invention provides a means for electronically generating control signals based upon actual engine speed.

A system for controlling the performance and efficiency of an internal combustion engine is disclosed in U.S. Pat. No. 3,757,755 to Carner. This reference discloses an apparatus utilizing true coding of the positions of the individual cylinders and crankshaft positions. This is accomplished by physically coding the crankshaft and providing sensors for scanning coded areas.

It is the purpose of this invention to create an apparatus for controlling the ignition or fuel injection of a multiple cylinder 4-cycle internal combustion engine which operates with a high degree of precision with regard to timing.

SUMMARY OF THE INVENTION

There is provided in accordance with the invention a camshaft having a single mark scanned by a sensor and a crankshaft, having a plurality of teeth-like marks uniformly distributed over the circumference and position markings associated with each cylinder, scanned by second and third sensors, respectively. The signals generated by the sensors are fed to an evaluating circuit which in turn develops the control signals which are fed to either an ignition or a fuel injection distributor.

Where the number of cylinders in the engine is odd, the single mark on the camshaft begins at a point located midway between two directly successive position markings associated with the cylinder groups having a larger number of cylinders. In another embodiment, the engine may have an odd or even number of cylinders, where the positions markings located on the crankshaft flywheel differ in length from one another by multiples thereof. This arrangement does not require a successive mechanical ignition or a fuel injection distributor.

The extension of the single marking over 180° of the camshaft, in accordance with this invention, is the availability of control signals immediately following starting. After two rotations of the crankshaft, control signals may be produced.

For a better understanding of the present invention together with other and further objects, reference is made to the following description taken in conjunction with the accompanying drawings, and its scope will be pointed out in the appended claims.

BRIEF DESCRIPTION OF THE DRAWINGS

FIGS. 1 and 2 are cross-sectional views of the camshaft and the flywheel connected to the crankshaft, respectively;

FIG. 3 is a schematic diagram of an evaluating circuit for an engine with an odd number of cylinders;

FIG. 4 is a pulse diagram for the circuit shown in FIG. 3;

DESCRIPTION OF THE PREFERRED EMBODIMENT

Figure 5:
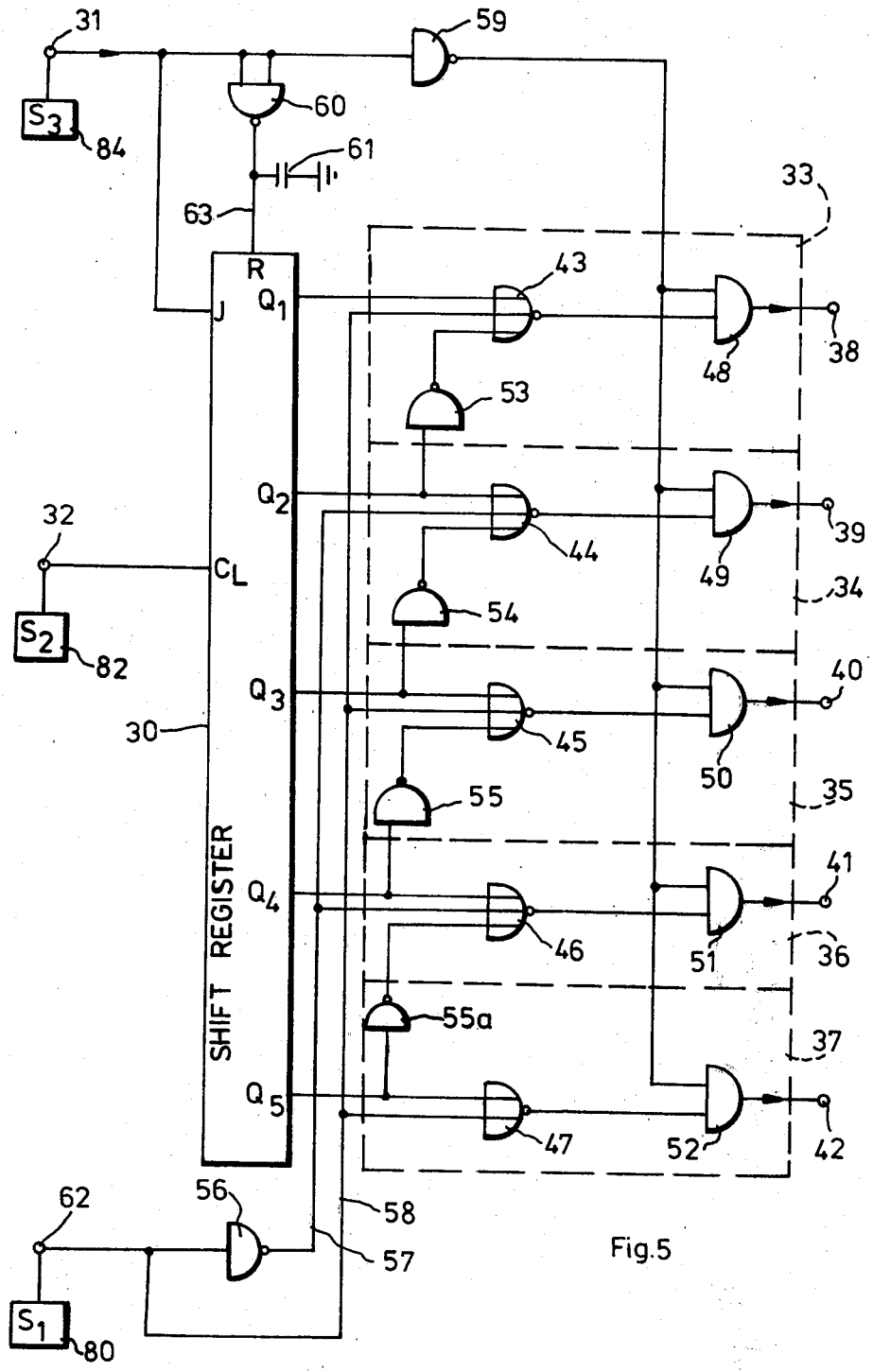
FIG. 5 illustrates another embodiment of the evaluating circuit.

In FIG. 1, the camshaft rotating at one-half of the rotational speed of the crankshaft of the engine and 1 is provided with a single mark 2, which extends over one-half or 180 degrees of the camshaft circumference. The start 3 of single mark 2 is indicated in FIG. 2 by the arrow 3', relative to the markings on the flywheel 4.

The single mark 2 and markings which are affixed to the flywheel 4, and will be discussed further on, are formed by magnetic asymmetry. This may be achieved by providing a cavity of magnetically active material from the camshaft or a material of greater magnetic activity which has been inserted into the camshaft. A sensor 70 for detecting the presence of the mark is affixed to the engine and generates electric pulses whose length are inversely proportional to the speed of the engine.

As noted above, FIG. 2 schematically illustrates the flywheel 4 of the engine, which is rigidly affixed to the crankshaft. Flywheel 4 has a plurality of teeth 5 uniformly distributed over the periphery of the flywheel. The teeth 5 serve to engage the pinion of the starter motor for the engine (not shown). Additionally, the flywheel 4 has position markings 6 and 7 which are divided into two groups. The two groups consist of those cylinders which ignite or take in fuel during the same rotation of the crankshaft. Therefore, one group includes those cylinders which ignite during one revolution of the crankshaft and the second group consists of those cylinders which ignite during the following revolution of the crankshaft. The position markings 6 and 7 are different in order to distinguish between the two groups. The position markings 6 of the smaller group consists really of a single short line while the position markings 7 are characterized by two lines. The position markings 6 further corresponds to the length of a tooth in the set of teeth 5 on flywheel 4. The other position markings 7 are characterized by two lines and are twice the length of the position markings 6.

It can be seen from FIG. 2 that one group of position markings 6 has two such markings while the other group of position markings 7 has three such markings. As previously mentioned in connection with FIG. 1, it is important that the beginning 3' of the single mark be located between two directly successive position markings and that further such markings should be associated with the group comprising a larger number of cylinders.

When the engine is operational, the sensors detect the various markings 2, 5, 6, and 7, generating pulses which are delivered to the evaluating circuits shown in FIG. 3. The pulses are illustrated in the time diagrams of FIG. 4. Waveform a indicates the output signal of the sensor 72 which sweeps the teeth 5 on the flywheel 4 (see FIG. 2). This waveform is an uninterrupted sequence of equal length pulses whose duration is inversely proportional to the engine speed. The next waveform b illustrates the output of the sensor 70 the single mark 2 on the camshaft (see FIG. 1). Waveform c shows the output of the sensor which detects the position markings 6 and 7 located on the flywheel 4. As can be seen from waveforms b and c the start b' of the pulse corresponding to the single mark 2 is located in time between two signals generated by position markings on the crankshaft which are associated with the cylinders of one cylinder group.

The evaluating circuit in FIG. 3 has three inputs 10, 11 and 12. Input 10 is connected to the first sensor 70 which detects the presence of the single mark 2 on the camshaft 1. The output of the second sensor 72, which scans with markings 5 on the crankshaft flywheel 4 is supplied to input 11. Input 12 receives the output of the third sensor 74 which sweeps the position markings 6 and 7, which are also located on the flywheel 4.

The structure and operation of the circuit shown in FIG. 3 will now be explained. When power is applied to the circuit, the output Q14 of flip-flop 14 will be high. This signal is supplied through inverting OR gates 16 and 17 to the reset terminals of flip-flops 18 and 19, respectively. The output of flip-flop 18, Q18, will therefore be low while the output Q19 will be high. As a result, the outputs of AND gate 20 and the inverting OR gate 21 will also be low. Similarly, the outputs of the OR gate 22 and the AND gate 23 remain low. Therefore, no output pulse will appear at terminal 24 of the evaluating circuit, regardless of the signals at the inputs 10, 11 and 12.

If the signal at input terminals 12 is low, this indicates that the third sensor 74 does not detect any of the position markings 6 and 7. However, if the second sensor 72 detects the teeth 5 thus presenting a signal at the input terminal 11 and a high signal is present at the input terminal 10, which is maintained for the duration of one crankshaft rotation, and the crankshaft and the camshaft are in fact rotating, the input terminal 11 will shortly receive a low signal after a given period of time, and the inverting OR gate 25 will produce a positive pulse at its output, the length of which will depend upon the time delay characteristics of inverting OR gate 26. The gates 25 and 26 form a one-shot circuit, where all three inputs of the gate 26 and one input of gate 25 are connected to input terminal 11 and thus receive a high input signal. When that signal goes low, the output of gate 25 will go high (assuming input terminal 12 is low) until inverting OR gate switches bringing its output high and forcing the output of gate 25 low. This process is repeated whenever the input of gate 25 and gate 26 receive low input signals.

The first high level pulse at the output of the one-shot circuit 27 resets flip-flop 14. Further pulses at the output of the one-shot circuit 27 reset the flip-flops 18 and 19 to their original states.

Each transition from low to high at the input terminal 11 is transmitted to the clock inputs CL 18 and CL 19 of the flip-flops 18 and 19, respectively, via gates 26 and 28, if input 12 is high and the output of gate 29 is low. Whenever a positive pulse appears at the clock input CL 18 of the flip-flop 18, the prevailing state at the input D18 is transmitted to the flip-flop output Q18.

This circuit has the ability to alternately distinguish between position markings consisting of two lines and position markings consisting only of a single line. If a positive pulse appears at input termainl 12 due to the detection of a single line of a position marking 6, no pulse will be delivered to the AND gate 23 because AND gate 20 will also be low. However, if the third sensor 74 detects a position marking consisting of two lines, the output Q19 of the flip-flop 19 will go low when a second pulse appears at the clock input CL 19, on account of the second line of the position marking 7, and the output of the inverting OR gate 21 will in turn go high and cause the output of OR gate 22 to go high. After the input terminal 12 goes low, and when the next positive pulse appears at input terminal 11, which happens when the next tooth 5 passes second sensor 72, the remaining inputs to AND gate 23 will be high causing its output to be also high. A high signal is delivered at output terminal 24 for the duration of the pulse appearing at input terminal 11. Thus, the position markings 7, consisting of two lines, are recognized while position markings 6, consisting of only a single line, are not detected.

The next negative pulse edge appearing at the input terminal 11 causes the flip-flops 18 and 19 to be reset as described above, as input terminal 12 is low and gate 25 is not forced low by the signal appearing at input terminal 12. When input terminal 12 receives a high signal, the position markings 6, consisting of one line as shown in FIG. 2, can be detected since AND gate 20 has one input high.

When the signal at input terminal 12 is high, the output of Q18 of flip-flop 18 is also high. If the signal appearing at input terminal 12 goes low, signifying that a position markings 6 has been detected, the next pulse that appears in input terminal 11 is transmitted to output terminal 24 because the output of gates 20 and 22 are also high. If two pulses appear at input terminal 11 due to the detection of two teeth 5 while input terminal 12 is high, the output Q19 of the flip-flop 19 reverts to low forcing gate 20 low. Accordingly, when the signal at input terminal 12 is low and a second high pulse appears at the input terminal 11, the output terminal 24 will remain low.

The output waveform of the circuit shown in FIG. 3 is illustrated at d in FIG. 4.

An ignition circuit and distributor 86 or a fuel injection control circuit 88 may be connected to the output terminal 24.

The circuit illustrated in FIG. 3 assumes that the succession of position markings will be for the same cylinder group and that the single mark on the camshaft will start between two such markings. In FIG. 5, a circuit is shown which may be utilized with internal combustion engines having an even number of cylinders also. Furthermore, the circuit eliminates the need for a mechanical ignition or a fuel injection distributor.

The circuit in FIG. 5 has a five-bit shift register 30 having an input 31 connected to the third sensor 84 which, as noted previously, scans the position markings 6 and 7 on the flywheel 4. A clock input 32 receives its input from a second sensor 82, which scans the teeth markings 5 on the flywheel 4. This particular embodiment is arranged to accommodate a five cylinder engine and thus includes five decoder circuits 33 through 37, having outputs 38 through 42, respectively, each of which leads to one cylinder. A third input terminal 62 of the circuit is connected to the first sensor 80, which scans the 180 degree mark on the camshaft. If, at a given time, the first sensor does not detect the mark 2, the signal at input terminal 62 is low. Thus, the input to decoders 33, 35 and 37 are low, while the input to decoders 34 and 36 are high, rendering the latter two inoperative. When the mark 2 is detected, a high signal appears at input terminal 62 forcing gates 43, 45, and 47 low, while permitting decoders 34 and 36 to remain operative. Therefore, signals can be transmitted to the second and fourth cylinders by those decoders.

Each decoder contains an inverting OR gate 43 to 47 and an AND gate 48 through 52. The decoders 33, 34, 35 also contain one inverter 53, 54, 55 and 55a, respectively, each. Furthermore, an invert 56 follows the input terminal 62, and supplies an inverted signal to decoders 34 and 36 via line 57. This permits the circuit to switch between odd-numbered cylinders and even-numbered cylinders as a function of the signal supplied by the first sensor 80 to input terminal 62.

The operation of the circuit in FIG. 5 will now be explained. At start up, the third sensor 84 supplies a low signal to input terminal 31 which is inverted by inverting AND gate 60 causing a high signal to appear at reset terminal 63 of shift register 30. In this case, the output terminal Q1 through Q5 of the shift register 30 will be high, forcing the inverting OR gates 43 through 47 in each decoder to go low and therefore the outputs of AND gates 48 through 52 will correspondingly be low.

If a position marking is detected by the third sensor 84, a high signal will appear at input terminal 31 and the reset input 63 will be low. In this condition, all pulses appearing at clock input 32, corresponding to the number of teeth 5 scanned by the second sensor 82, will enter shift register 30 in serial fashion. Depending on the number of pulses received at input terminal 32, the inputs Q1 through Q5 of the shift register 30 will switch to low. With the aid of inverters 53, 54,55, and 55a, only one shift register output Q1 through Q5 will be transmitted to the output of the decoders. That is, if Q1, Q2, and Q3 develop a signal to be transmitted through to the output, inverting OR gates 43 and 44 will be blocked and only inverting OR gate 45 will permit the passage of the signal from Q3.

If the signal at input terminal 31 shifts to low, AND gates 48 through 52 will have one input each at a high level and therefore will pass any high signal appearing at the other input; thus, any signal supplied by the shift register passing through gates 43 through 47 on to gates 48 through 52, respectively, will pass through to the outputs 38 through 42, respectively. The high level signal applied to gates 48 through 52 is developed by inverter 59. After a given time, a capacitor 61 will recharge to a high level, on account of the low level signal inverted by NAND gate 60 and shift register 33 will reset via terminal 63.

Depending on the signal appearing at input terminal 62, signals for even-numbered or odd-numbered cylinders will be permitted to pass. For instance, a high level signal appearing at terminal 62 will block the passage of signals through 43, 45, and 47, while permitting signals to pass through gates 44 and 46.

Figure 6:
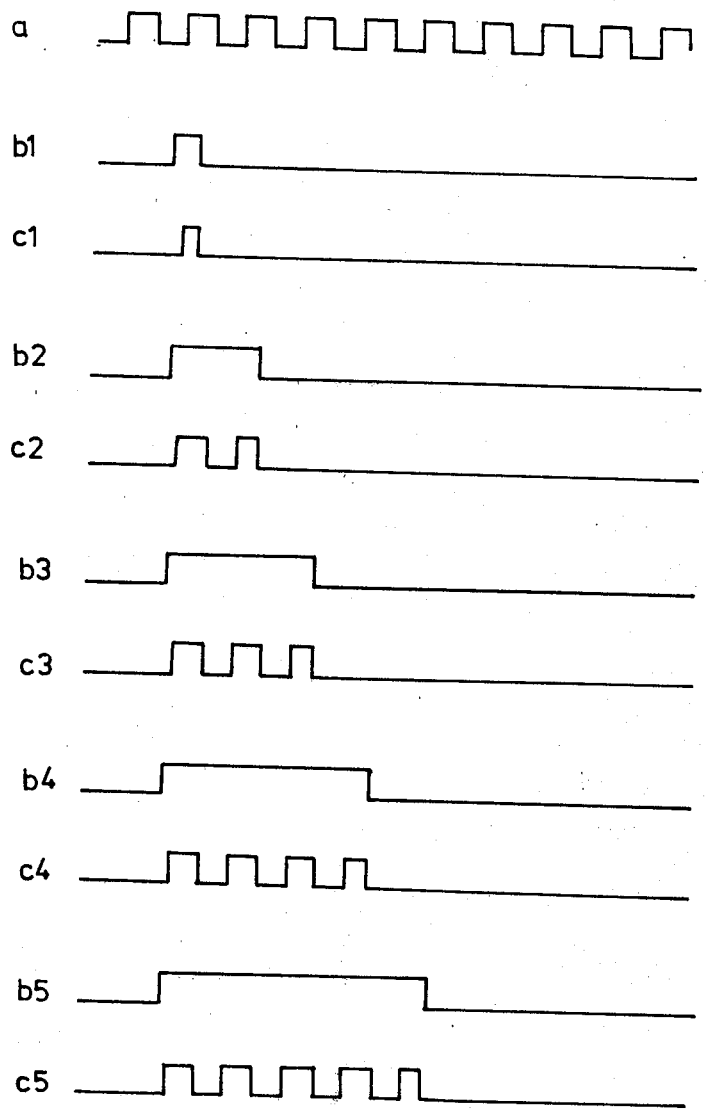
FIG. 6 is a pulse diagram for the circuit shown in FIG. 5.

FIG. 6 illustrates the timing diagram for the circuits shown in FIG. 5. Waveform a illustrates the pulses obtained from the second sensor 82 which scans the teeth markings 5 on flywheel 4. Waveforms b1 through b5 represent the position marking signals associated with the individual cylinders 1 through 5. It can be seen that the signals b1 through b5 differ from each other by multiples of the duration of pulses in waveform a. Accordingly, the signals illustrated in waveforms b1 through b5 are converted into individual pulses as shown in waveform c1 through c5.

While there has been described what is believed to be the preferred embodiment of the invention those skilled in the art will recognize that other and further modifications may be made thereto without departing from the spirit of the invention, and it is intended to claim all such embodiments as fall within the true scope of the invention.

We claim:

1. Apparatus for generating control signals for controlling the timing of at least one of the events contained in the group comprising spark ignition and fuel injection in an internal combustion engine, having a plurality of cylinders, a crankshaft, and a camshaft that rotates at one-half of the rotational speed of the crankshaft, comprising:
    an integral circular member on said crankshaft having a plurality of teeth distributed about the circumference of said member and a plurality of timing position markings, each of said markings being associated with one of said cylinders, said timing position markings being divided into two groups, each of said two groups being associated with cylinders to be furnished with said control signals during one revolution of said crankshaft;
    a single mark on said camshaft extending over one-half the circumference of said camshaft, beginning at a shaft angle corresponding to a crankshaft position between two of said position markings from the same one of said two groups;
    sensing means including a first sensor for scanning said single mark, a second sensor for scanning said teeth, and a third sensor for scanning said position markings, where each of said sensors has an output; and
    an evaluating circuit responsive to said output of said first sensor and having an output for said control signals, said circuit connected to said outputs of said second and third sensors and including gating means for gating said output of said third sensor in response to the output of said first sensor and deriving said control signals therefrom in response to said position markings for one of said two groups during alternate revolutions of said crankshaft.

2. In an apparatus set forth in claim 1, where said internal combustion engine has an odd number of cylinders, the improvement further wherein each of said position markings belonging to one of said two groups are identical, and wherein said single mark begins at a shaft angle corresponding to a crankshaft position that is between two directly successive ones of said position markings that are associated with the larger one of said two groups of cylinders.

3. In an apparatus as set forth in claim 1, the improvement further wherein said position markings for each of said cylinders differ in length by multiples of one of said markings and wherein there are provided decoders, one for each of said cylinders, each of said decoders having a first control input and a second control input, and an output; further wherein said cylinders are divided into an even-numbered group and an odd-numbered group corresponding to even-numbered and odd-numbered cylinders and where said decoders are arranged such that said decoders of said even-numbered group and said decoders of said odd-numbered group alternately receive said output of said first sensor; and wherein said evaluating circuit further includes a shift register, responsive to said outputs of said second and third sensors, said shift register having outputs each of which corresponds to one of said cylinders where said second control inputs of said decoders are responsive to said outputs of said shift register.

* * * * *